Dec. 12, 1967 W. M. COOPER 3,357,745
MOBILE CONCRETE FLOOR SAWING MACHINE HAVING
PIVOTALLY ADJUSTABLE FRAME SECTIONS
Filed May 26, 1965 2 Sheets-Sheet 1

INVENTOR
WILLIAM M. COOPER
BY Cohn and Powell
ATTORNEYS

Dec. 12, 1967  W. M. COOPER  3,357,745
MOBILE CONCRETE FLOOR SAWING MACHINE HAVING
PIVOTALLY ADJUSTABLE FRAME SECTIONS
Filed May 26, 1965  2 Sheets-Sheet 2

INVENTOR
WILLIAM M. COOPER
BY Cohn and Powell
ATTORNEYS

United States Patent Office 3,357,745
Patented Dec. 12, 1967

3,357,745
MOBILE CONCRETE FLOOR SAWING MACHINE HAVING PIVOTALLY ADJUSTABLE FRAME SECTIONS
William M. Cooper, St. Louis, Mo., assignor to Champion Manufacturing Company, St. Louis, Mo., a corporation of Missouri
Filed May 26, 1965, Ser. No. 459,018
2 Claims. (Cl. 299—39)

ABSTRACT OF THE DISCLOSURE

A mobile rotary saw including a drive base pivotally mounted above a carrying frame, the drive base having a saw blade mounted at its front end. The carrying frame is provided with front and rear wheels, the front wheels being integrated into the pivotal connection between the drive base and carrying frame. A handle is located at the rear of the base, and an extensible arm is mounted between the handle and the frame to provide pivotal adjustment of the drive base relative to the carrying frame. The extensible arm has an adjustment capability sufficient to raise the front wheels from the ground during the cutting operation and distribute the weight of the machine as a whole between the saw blade and the rear wheels, thereby utilizing the weight of the machine to enhance the cutting power of the blade.

This invention relates generally to improvements in a saw machine, and more particularly to an improved concrete saw.

It is an important objective to provide a concrete saw in which the weight of the machine including the motor can be advantageously and selectively utilized to create an increased downward force on the saw blade, and thereby provide a more effective and efficient cutting action.

An important object is achieved by the provision of first and second ground-engaging means supporting the base on which the saw blade and power means are carried, the second ground-engaging means being located between the blade and the first ground-engaging means, and by the provision of means for selectively raising the second ground-engaging means from the ground to support the machine on the first ground-engaging means and saw blade.

Another important objective is afforded by the structural arrangement of the component parts of the machine so that the center of gravity of the machine is located in a vertical plane between the first and second ground-engaging means, and preferably closer to the second ground-engaging means, whereby the first and second ground-engaging means will support the machine when moved during non-cutting operation and during certain cutting operations, and whereby the rearmost first ground-engaging means and saw blade will support the machine when the second ground-engaging means is raised selectively during certain other cutting operations, the machine weight being used to increase the loading on the saw blade.

Yet another important object is attained by adjustably connecting a frame to the base that carries the power means and saw blade, the first ground-engaging means being mounted to the frame while the second ground-engaging means is mounted to the base between the blade and first ground-engaging means, and by the provision of means adjusting the relative position of the base and frame to raise or lower the saw blade.

An important object is realized by the provision of means interconnecting the base and frame to adjust the relative position of the base and frame, and thereby selectively raise the second ground-engaging means from the ground so that the machine is supported only by the first ground-engaging means and saw blade.

Another important object is provided in that the frame is pivotally mounted to the base, and that the second ground-engaging means is mounted to both the base and the frame at the pivot axis, and by the provision of means interconnecting the base and frame for pivotally adjusting the relative position of the base and frame whereby selectively to raise or lower the saw blade.

Still another important object is achieved by the structural arrangement in which the second ground-engaging means is mounted on the base and frame at their pivot axis, the second ground-engaging means being located between the first ground-engaging means mounted on the frame and the saw blade mounted on the base, and in which the means pivotally adjusting the relative position of the frame and base acts to raise the second ground-engaging means from the ground to support the machine on the first ground-engaging means and saw blade.

An important object is afforded in that the adjustable means interconnecting the base and frame includes a handle attached to the base and an adjustable-length arm extending between and interconnecting the handle and pivoted frame.

Another important objective is to provide a concrete saw that is simple and durable in construction, economical to manufacture and assemble, highly efficient in operation, and which can be readily used by anyone with little or no instruction.

The foregoing and numerous other objects and advantages of the invention will more clearly appear from the following detailed description of a preferred embodiment, particularly when considered in connection with the accompanying drawings, in which.

Figure 1:
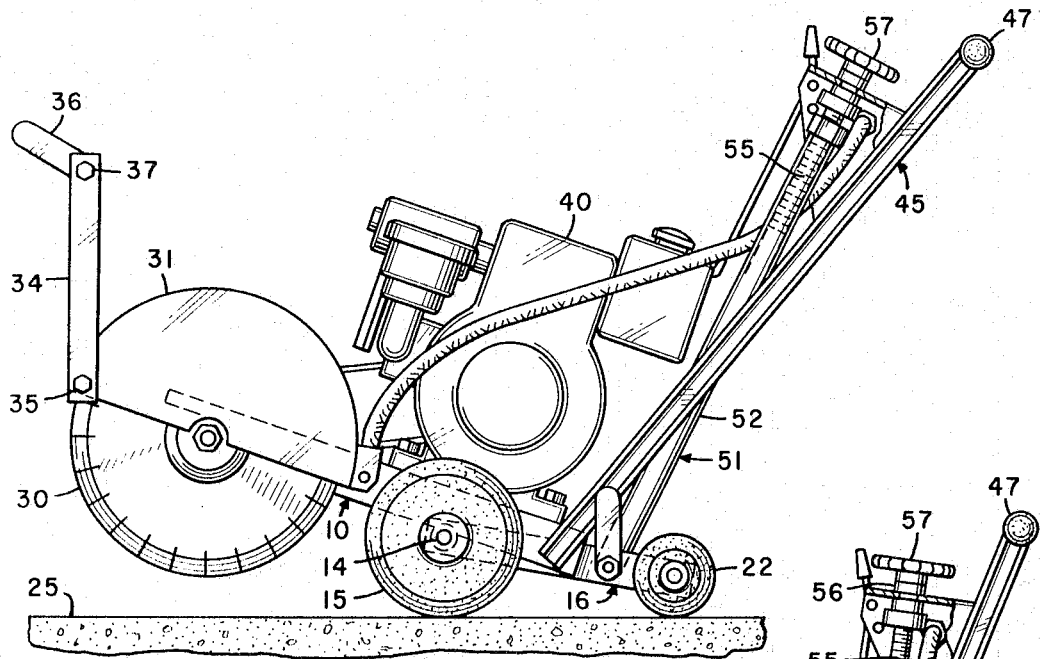
FIG. 1 is a side elevational view of the concrete saw in which the saw blade is raised and in which the machine is supported by both the front and rear wheels.

Referring now by characters of reference to the drawings, the concrete saw machine includes a base referred to by 10 formed by an inverted, substantially U-shaped channel having a top flat wall 11 and depending side flanges 12. Attached to each of the side flanges 12 is a laterally extending journal 13. The journals 13 are transversely aligned and are located closer to the rear end of base 10 than to the front end.

An axle 14 is rotatively mounted in the aligned journals 13, the axle 14 extending transversely of the base 10. More particularly the axle 14 extends between the side flanges 12 below the base wall 11. A wheel 15 is fixed to each end of the axle 14 at each side of the base 10, the wheels 15 constituting second ground-engaging means.

Figure 3:
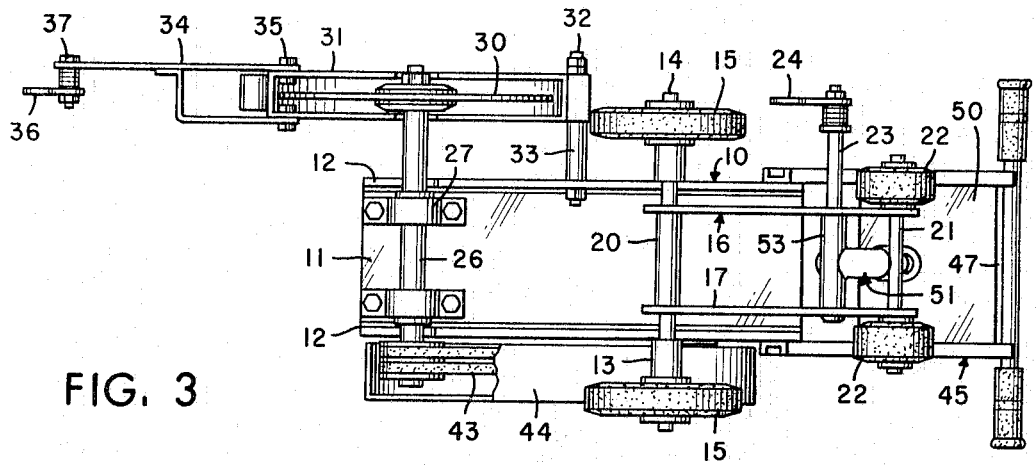
FIG. 3 is a bottom plan view of the machine shown in FIG. 2.
Figure 4:
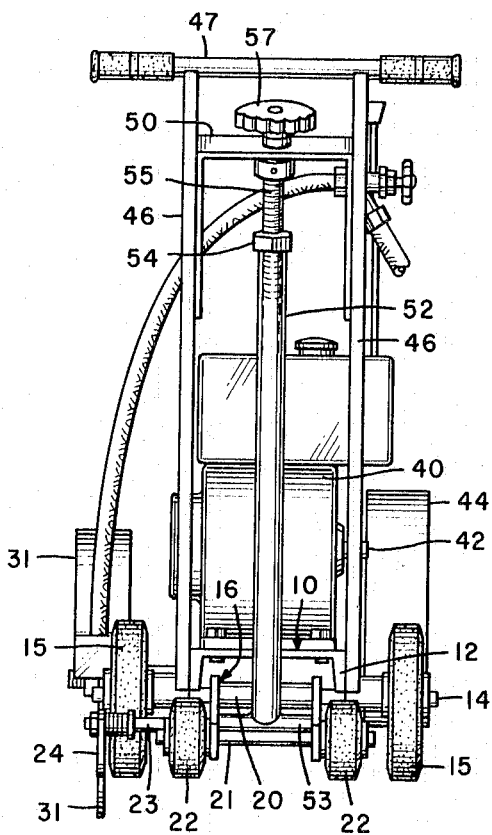
FIG. 4 is a rear elevational view thereof.

A frame indicated by 16 is located below the base 10 near its rear end. Specifically, the frame 16 includes a pair of elongate, parallel side members 17 interconnected at one end by a sleeve 20. As is best seen in FIG. 3, the sleeve 20 is pivotally mounted on the wheel axle 14 between the side flanges 12 of base 10. The opposite ends of the side members 17 are interconnected by a transverse axle 21, the ends of the axle 21 extending laterally from each side of the frame members 17. A wheel 22 is fixed to each end of axle 21, the wheels 22 constituting first ground-engaging means. The pivotally mounted frame 16 disposes the wheels 22 rearwardly of the other pair of wheels 15 and rearwardly of the base 10.

Retained by and extending between the side frame members 17 is rod 23 that extends laterally from one side of the frame 16. A marker 24 is attached to the end of rod 23, the marker 24 being movable about the rotative axis of rod 23 so as to bear against the concrete surface 25. The marker 24 serves to indicate the line of saw cut provided by the machine and is readily visible by the operator during operation. If desired, the marker 24 can be moved upwardly out of engagement from the concrete surface 25 to an inoperative position as is illustrated in FIG. 1.

Rotatively mounted on the front end of base 10 is a blade shaft 26. Specifically, the shaft 26 is rotatively mounted on the underside of the base wall 11 by a pair of mounting brackets 27, the shaft 26 extending transversely of the base 10 and extending laterally beyond each of the side flanges 12. Each of the side flanges 12 is cut away at its front end to accommodate the passage of blade shaft 26.

A circular saw blade 30 is fixed to one end of shaft 26. Fitted over the upper half of blade 30 is a hollow, semi-circular housing 31 constituting a shield. The housing 31 is attached to the base 10 by a nut and bolt connection 32. The nut and bolt connection 32 extends between and interconnects a rear portion of housing 31 to the adjacent base flange 12. A spacer 33 is located between the housing 31 and base flange 12 and is associated with the bolt and nut connection 32, whereby to hold the housing 31 in the protective position over the saw blade 30.

Figure 2:
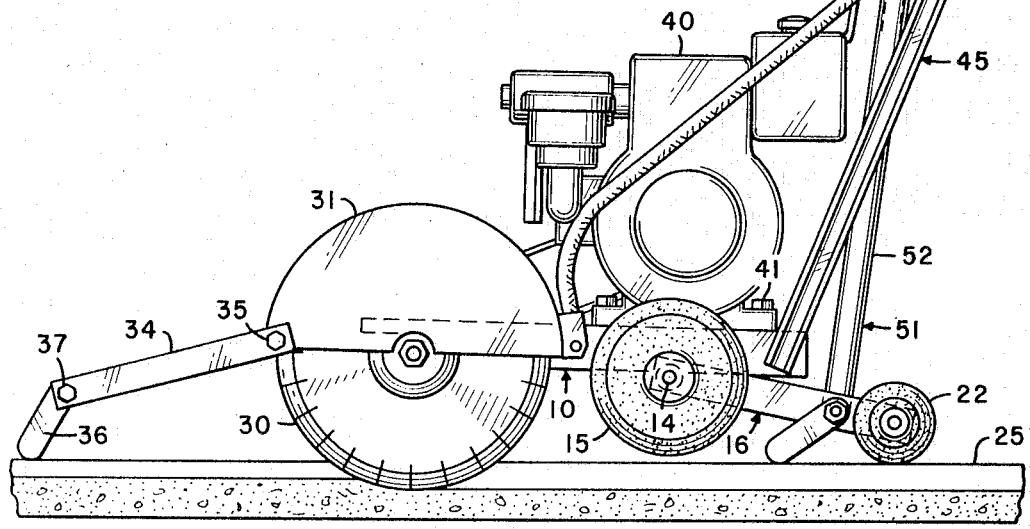
FIG. 2 is a side elevational view showing the saw blade lowered into cutting position and showing the front wheels raised from the ground so that the machine is supported by the rear wheels and saw blade.

A rod 34 is pivotally mounted by pin 35 to the front portion of blade housing 31. Another marker 36 is pivotally mounted to the front end of rod 34 by pin 37. The marker 36 is adapted to engage the surface of the concrete 25 to indicate the plane of cut of the saw blade 30. As will be apparent from FIG. 1, the marker rod 34 may be swung upwardly to an inoperative position or may be swung downwardly to the operative position as illustrated in FIG. 2. As is best seen in FIG. 3, the saw blade 30 and the markers 24 and 36 lie in the same vertical plane at one side of the machine.

The power means consists of a gasoline motor 40 attached by bolts 41 to the top wall 11 of base 10. It will be importantly noted that the motor 40 constitutes the heaviest component part of the machine and its disposition on the base 10 determines essentially the placement of the center of gravity of the machine. Therefore, the motor 40 is located on and attached to the base 10 in a position so that the center of gravity of the machine lies in a vertical plane between the rotative axes of ground wheels 15 and 22. The center of gravity is preferably located closer to the axis of the wheels 15 in order for the greatest possible force to be exerted on the saw blade 30 by the weight of the motor 40 when the wheels 15 are raised from the ground, as will be explained later upon further description of parts.

The drive shaft 42 of the motor 40 is operatively connected to one end of the blade shaft 26 by a belt and pulley drive 43. A shield 44 carried by the base 10 is located about the belt and pulley drive 43. Energization of the motor 40 causes rotation of the drive shaft 42 and causes rotation of the saw blade 30 through its shaft 26 by the belt and pulley drive 43.

The handle 45 is fixed to the rear of base 10 and extends upwardly and rearwardly. The handle 45 includes a pair of spaced, parallel handle frames 46 interconnected at their upper ends by a transverse handle grip 47. The lower ends of the handle frames 46 are rigidly attached to the rear ends of the base flanges 12. Located between and fixed to the handle frames 46 is a bracket 50.

An adjustable-length arm generally indicated by 51 extends between and interconnects the frame 16 and the handle 45. The arm 51 includes an elongate tube 52 having a sleeve 53 at its lower end pivotally mounted on the marker rod 23 and located between the side frame members 17. The upper end of tube 52 is provided with a threaded nut 54 that is adapted to threadedly engage a screw shaft 55. The screw shaft 55 is rotatively mounted to the bracket 50 by a pair of bearings 56. A knob 57 is fixed to the upper end of screw shaft 55.

The handle 45 and the adjustable-length arm 51 constitute adjustment means interconnecting the frame 16 and the base 10 which can be selectively adjusted to determine the relative pivotal position of the frame 16 and base 10. For example, when the screw shaft 55 is retracted within the associated tube 52, the adjustable-length arm 51 acting through the handle 45 pivots the base 10 in a clockwise direction to swing the front end of the base 10 upwardly to the position shown in FIG. 1. This action raises the blade 30 away from the concrete surface 25. The adjustable-length arm 51 pivots about the axis provided by its sleeve 53 to enable this movement. When the blade 30 is raised, the machine is supported by both pair of ground wheels 15 and 22.

Conversely, when the screw shaft 55 is extended, the base 10 is pivoted in a counterclockwise direction about the axis of the pivotal connection between frame 16 and base 10 so as to lower the blade 30 selectively to a cutting position. During certain usual cutting operations, the machine is supported by both pair of ground wheels 15 and 22.

However, under certain cutting conditions, it is desirable to have a greater weight exerted on the cutting blade 30 for more effective and efficient cutting action. Under these circumstances, the knob 57 is turned so as to extend the screw shaft 55 even further. When this is done with the rear wheels 22 seating on the concrete surface 25 and the blade 30 engaging the concrete surface 25, continued relative pivotal movement of the frame 16 and base 10 has the effect of raising the ground wheels 15 from the concrete surface 25 as is illustrated in FIG. 2. When the wheels 15 are raised, the machine is supported solely by the rear wheels 22 and the saw blade 30. The weight of the machine, provided essentially by the weight of the motor 40, is now acting as a downward load on the saw blade 30. Of course, the screw shaft 55 can be retracted subsequently, when desired, to lower the wheels 15 back into engagement with the concrete surface 25.

It is thought that the operation and functional advantages of the concrete saw machine have become fully apparent from the foregoing detailed description of parts, but for completeness of disclosure, the usage of the machine will be briefly described. It will be assumed that the machine is initially conditioned so that the saw blade 30 is raised in the inoperative position shown in FIG. 1, with the machine being supported by the two pair of wheels 15 and 22. When so conditioned, the machine may be pushed easily from place to place by rolling on the wheels 15 and 22.

To condition the machine for cutting operation, the markers 36 and 24 are lowered to engage the concrete surface 25. The knob 57 is turned in a direction to extend the screw shaft 55. The effect of the extension of the screw shaft 55 changes the angular relationship of the frame 16 and base 10 by pivoting the base 10 about the axis defined by the wheel axle 14. As the base 10 pivots in a counterclockwise direction, the front end of the base 10 swings downwardly to lower the saw blade 30 to a cutting position. The cutting position of blade 30 can be accurately determined by manipulation of the knob 57 and the precise depth of cut in the concrete is realized. For shallow cuts, the blade 30 is lowered to the desired operative position and the machine is supported by both pair of wheels 15 and 22.

For deeper cuts or for cuts in material in which a greater force has to be exerted on the saw blade 30 for more effective and efficient cutting action, the knob 57 is turned in the same direction to extend the screw shaft 55 even further. This extensible arm 51 acting through the handle 45 pivots the base 10 in a counterclockwise direction relative to the frame 16 and its common pivot axis defined by wheel axle 14 to such an extent that the wheels 15 are raised off of the concrete surface 25. When the wheels 15 are raised in this manner, the entire weight of the machine is supported by the rear wheels 22 and by the saw blade 30 when the blade 30 is placed against the concrete surface. The weight of the machine provides sufficient increased downward force on the saw blade 30 so that the effective cutting action of the blade is enhanced.

Upon manipulation of knob 57 in the other direction to retract the screw shaft 55, the base 10 is pivoted in a clockwise direction about the pivot axis defined by wheel axle 14 and relative to the frame 16 so that the wheels 15 are lowered back into engagement with the concrete surface 25. The weight of the machine is then carried again by both pair of ground wheels 15 and 22, the center of gravity of the machine being in a vertical plane just behind the pivot axis defined by wheel axle 14. If it is desired to raise the saw blade 30 back to its inoperative position from the position of FIG. 2 to the position of FIG. 1, the screw shaft 55 is retracted further within its associated tube 52.

Although the invention has been described by making detailed reference to a single preferred embodiment, such detail is to be understood in an instructive, rather than in any restrictive sense, many variants being possible within the scope of the claims hereunto appended.

I claim as my invention:

1. A saw machine comprising:
   (a) a base,
   (b) a saw blade mounted on the base,
   (c) a power means mounted on the base and drivingly connected to the saw blade,
   (d) a frame pivotally mounted to the base,
   (e) a first ground-engaging means mounted on the frame,
   (f) a second ground-engaging means mounted to the base and frame at their pivot axis, and located between the first ground-engaging means and the saw blade,
   (g) the center of gravity of the machine as a whole, including the portion between the saw blade and the second ground-engaging means, being located in a vertical plane between the first and second ground-engaging means as close to the second ground-engaging means as possible to ensure maximum load distribution to the blade during the cutting operation yet maintaining the stability of the machine at all times,
   (h) a handle attached to the base,
   (i) an arm having one arm portion fixed to the frame and another arm portion fixed to the handle and interconnected to the said one arm portion, and
   (j) means associated with the arm extending or retracting the arm portions to adjust the pivotal position of the frame and base so as to raise selectively the second ground-engaging means from the ground to support the machine on the first ground-engaging means and saw blade only, thereby to relieve the second ground-engaging means of load and distribute the load from the machine as a whole between the saw blade and the first ground-engaging means during the cutting operation.

2. A saw machine comprising:
   (a) a base,
   (b) a rotary saw blade mounted on the base on a transverse blade axis,
   (c) a power means mounted on the base,
   (d) means drivingly connecting the power means to the saw blade,
   (e) a frame pivotally mounted to the base on a transverse pivot axis substantially parallel to the blade axis,
   (f) a first ground-engaging means mounted on the frame,
   (g) a second ground-engaging means mounted to the base and frame at their pivot axis,
   (h) the center of gravity of the machine as a whole, including the portion between the saw blade and the second ground-engaging means being located in a vertical plane between the first and second ground-engaging means as close to the second ground-engaging means as possible to insure maximum load distribution to the blade during the cutting operation yet maintaining the stability of the machine at all times,
   (i) a handle attached to the base and extending upwardly and rearwardly,
   (j) an arm having one arm portion pivotally attached to the frame on a transverse axis substantially parallel to the transverse pivot axis of the base and frame and located between the first and second ground-engaging means,
   (k) the arm having a screw shaft threadedly connected to the said one arm portion and attached to the handle, and
   (l) means turning the screw for extending or retracting the screw in the said one arm portion to adjust the pivotal position of the frame and base so as to raise or lower the saw blade and so as selectively to raise the second ground-engaging means from the ground to support the machine of the first ground-engaging means and saw blade only, thereby to relieve the second ground-engaging means of load and distribute load from the machine as a whole between the saw blade and the first ground-engaging means during the cutting operation.

References Cited

UNITED STATES PATENTS

| | | | |
|---|---|---|---|
| 2,468,336 | 4/1949 | Lewis | 299—39 |
| 2,736,544 | 2/1956 | Wright | 299—39 |
| 2,973,950 | 3/1961 | Tucker | 299—39 |

ERNEST R. PURSER, *Primary Examiner.*